G. BURESS.
GAS ENGINE STARTER.
APPLICATION FILED MAY 28, 1908.
919,818.
Patented Apr. 27, 1909.
2 SHEETS—SHEET 1.
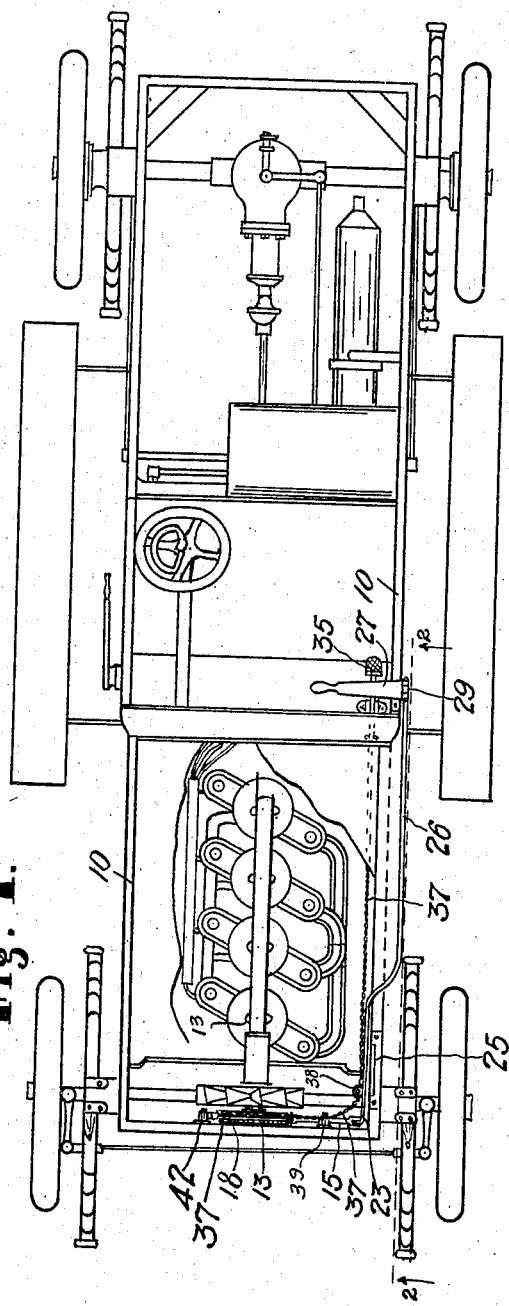
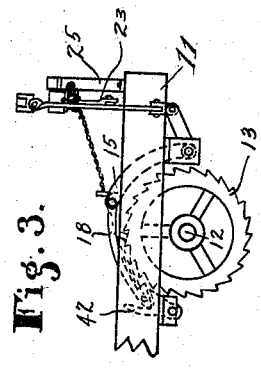
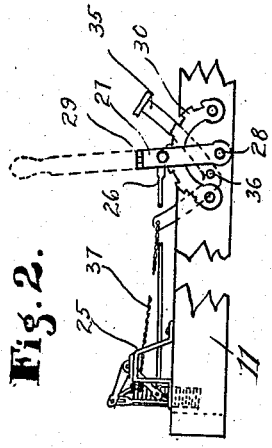
WITNESSES:
INVENTOR.
George Buress.
BY
ATTORNEY.

G. BURESS.
GAS ENGINE STARTER.
APPLICATION FILED MAY 28, 1908.

919,818.

Patented Apr. 27, 1909.
2 SHEETS—SHEET 2.

WITNESSES:
J. H. Swan.
P. J. Lockwood.

INVENTOR.
George Buress.
BY
V. H. Lockwood
ATTORNEY.

UNITED STATES PATENT OFFICE.

GEORGE BURESS, OF INDIANAPOLIS, INDIANA.

GAS-ENGINE STARTER.

No. 919,818.　　　Specification of Letters Patent.　　　Patented April 27, 1909.

Application filed May 28, 1908. Serial No. 435,415.

*To all whom it may concern:*

Be it known that I, GEORGE BURESS, of Indianapolis, county of Marion, and State of Indiana, have invented a certain new and useful Gas-Engine Starter; and I do hereby declare that the following is a full, clear, and exact description thereof, reference being had to the accompanying drawings, in which like numerals refer to like parts.

The object of this invention is to provide a practical and effectual starting mechanism for explosive engines, especially those used in automobiles, that can be conveniently and effectively operated by the driver or operator from the seat of the vehicle, and which will enable him to start the engine quickly, easily and safely.

One feature of the invention is that, after the engine has been put into action, the starting mechanism will hang clear of the shaft and gear thereon so that it will be noiseless thereafter.

Another feature of the invention is the great leverage the operator has for starting the engine and the peculiar mechanism of the lever and pawl for actuating the gear on the driving shaft.

Figure 4:
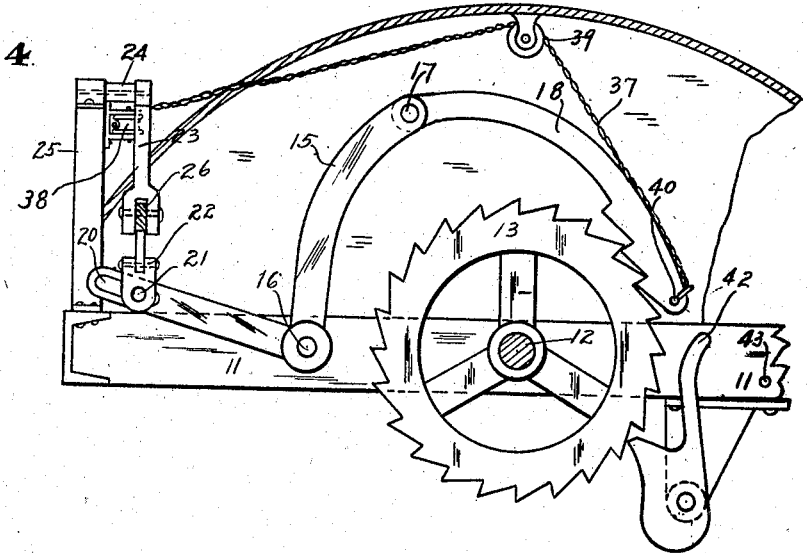
Figure 5:
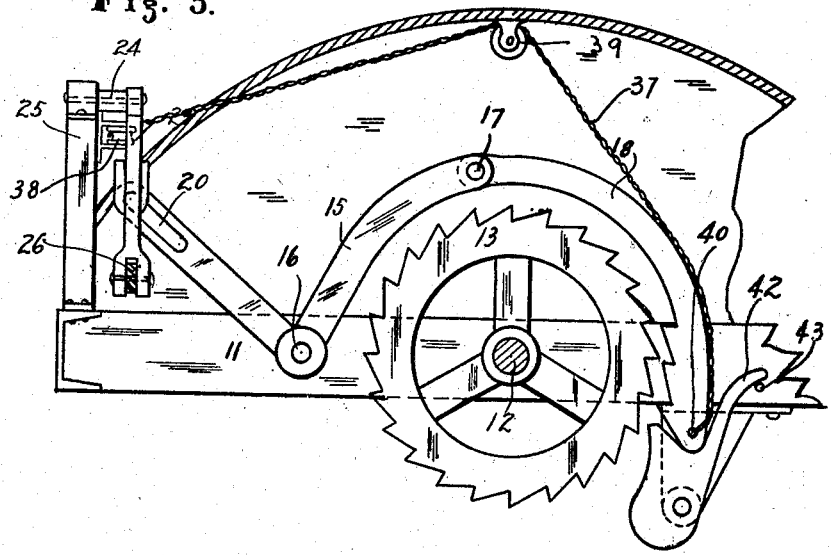

In the drawings Figure 1 is a plan view of an automobile equipped with my starting mechanism. Fig. 2 is a side elevation of a part of the frame of the automobile and said starting mechanism, parts being broken away. Fig. 3 is a front elevation of a portion of the automobile frame and engines, shaft and gear, and means for actuating the same. Fig. 4 is a rear elevation of the means for starting the gear on the engine shaft, in process of actuation. Fig. 5 is the same as Fig. 4 showing the parts in their unoperated position.

In detail 10 is a side bar of the main frame of the automobile, 11 is the front bar of said frame, 12 is the engine shaft and 14 the engines. The forward end of the engine shaft has bearing in the frame bar 11 and a ratchet wheel 13 is secured on the engine shaft just inside said bar 11 so as to operate vertically. The problem is to provide manually operated means for giving the gear 13 and shaft 12 a sufficient movement to start the engine. On the front bar 11 on the inside of the frame is the bell crank 15 fulcrumed to one side of the gear 13. One arm of the bell crank 15 is curved. To its free end 17 a hook or pawl 18 is pivoted in position for the pawl to engage the teeth of the gear 13 and when the bell crank is operated gives the said gear a partial revolution.

One arm of the bell crank is provided with a longitudinal slot 20 through which the pin 21 extends loosely, that is, in the stirrup 22 which is secured to one arm of the bell crank 23 which is fulcrumed on the pin 24 in the vertical stand 25 on the side frame bar 10, see Fig. 2. The bell crank 23 is actuated by the rod 26 that extends therefrom to the lever 27 back about the middle of the automobile where it is fulcrumed at 28 to the side of the bar 10. This lever has its upper portion hinged to a lower portion by the hinge 29 so that the upper portion can be thrown over, as shown in Fig. 1. Besides said lever 27 there is a segmental rack 30 with which the lever 27 may be locked to a rotatable position.

When the lever 27 is drawn rearwardly the pawl or hook 18 will be moved from the position shown in Fig. 5 to that shown in Fig. 4. In other words, the shaft of the engine will be partially rotated, sufficiently to start the engines. In order to disengage the pawl 18 from the gear 13 I provide a bell crank pedal 35 that is fulcrumed at 36 to the inside of frame bar 10, and which, when actuated, draws the chain 37 that runs over pulley 38 that is connected with the stand 25 and pulley 39 that is connected to the front part of the machine and ultimately to the hole 40 in the extreme end of the pawl or hook 18. When the pedal is operated said chain will lift the pawl and disengage it from the gear 13.

After operation of this starting mechanism and the lever 29 is pushed forwardly to its normal position the pawl 18 will be thrown into the position shown in Fig. 5 with its free end against the stop 42 pivoted to the bar 11 and out of engagement with the gear 13 which revolves with the shaft on the engine when the stop is engaged by the hook 18, but when the stop block is disengaged by said hook it rocks against the gear 13 and tends to prevent any backward movement of said gear. Said locking stop-block 42 is limited in its movement away from the gear 13 by a pin 43.

What I claim as my invention and desire to secure by Letters Patent is:

1. The combination of the frame of an automobile, an engine shaft mounted in connection therewith, a gear secured to the engine shaft, a bell crank pivoted to the frame beside said gear, a segmental hook pivotally connected with one arm of said bell crank and adapted to engage said gear when the bell crank is actuated and partially rotate the gear, and means for operating said bell crank.

2. The combination of the frame of an automobile, an engine shaft mounted in connection with the front part thereof, a gear secured on the engine shaft, a bell crank pivoted to the front part of said frame, a segmental hook pivotally connected with said bell crank for partially rotating said gear, a bell crank mounted in connection with the side of said frame and in operative connection with said front bell crank, a connecting rod extending from said side bell crank rearwardly of said frame, and a lever for reciprocating said connecting rod.

3. The combination of the frame of an automobile, an engine shaft mounted in connection with the front part thereof, a gear secured on the engine shaft, a bell crank pivoted to the front part of said frame, a segmental hook pivotally connected with said bell crank for partially rotating said gear, a bell crank mounted in connection with the side of said frame and in operative connection with said front bell crank, a connecting rod extending from said side bell crank rearwardly of said frame, a lever for reciprocating said connecting rod, a chain or the like connected with said hook so that when drawn it will disengage the pawl from said gear, and means near said lever with which said chain is connected for withdrawing the chain.

4. The combination with the shaft of an explosive engine, of a gear secured thereon, a segmental hook adapted to engage the said gear and partially rotate it for starting the engine, hand operated means for giving said segmental hook both its actuating and returning movements, and a rocking stop for the free end of the hook mounted so as to engage said gear when the hook is not in engagement with said gear.

In witness whereof, I have hereunto affixed my signature in the presence of the witnesses herein named.

GEORGE BURESS.

Witnesses:
O. M. GREENER,
J. H. SWAN.